United States Patent
Hsu et al.

(10) Patent No.: US 10,027,440 B2
(45) Date of Patent: Jul. 17, 2018

(54) CONTROL CIRCUIT OF WIRELESS USER EQUIPMENT

(71) Applicant: Realtek Semiconductor Corp., Hsinchu (TW)

(72) Inventors: Chao-Yuan Hsu, Taipei (TW); Ting-Yu Wei, Taipei (TW); Chi-Ming Cheng, Taipei (TW); Chen Chen, New Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 148 days.

(21) Appl. No.: 15/064,101

(22) Filed: Mar. 8, 2016

(65) Prior Publication Data

US 2016/0286402 A1     Sep. 29, 2016

(30) Foreign Application Priority Data

Mar. 23, 2015   (TW) .............................. 104109222 A

(51) Int. Cl.
| | |
|---|---|
| *H04L 29/06* | (2006.01) |
| *H04L 1/00* | (2006.01) |
| *H04W 12/02* | (2009.01) |
| *H04L 1/18* | (2006.01) |
| *H04W 80/02* | (2009.01) |
| *H04W 12/10* | (2009.01) |

(52) U.S. Cl.
CPC .......... *H04L 1/0043* (2013.01); *H04L 1/1874* (2013.01); *H04L 63/0457* (2013.01); *H04W 12/02* (2013.01); *H04W 12/10* (2013.01); *H04W 80/02* (2013.01)

(58) Field of Classification Search
CPC .  H04L 1/0043; H04L 1/1874; H04L 63/0457; H04W 12/02; H04W 12/10; H04W 80/02
USPC ....................................................... 380/270
See application file for complete search history.

(56) References Cited

U.S. PATENT DOCUMENTS

| | | | |
|---|---|---|---|
| 2006/0251105 A1* | 11/2006 | Kim ...................... | H04L 1/1685 370/449 |
| 2007/0171857 A1* | 7/2007 | Wang .................... | H04L 1/1867 370/328 |
| 2008/0123655 A1* | 5/2008 | Kim ...................... | H04L 1/1867 370/394 |
| 2014/0146697 A1* | 5/2014 | Kim ...................... | H04B 7/0413 370/252 |

* cited by examiner

*Primary Examiner* — Michael S McNally
(74) *Attorney, Agent, or Firm* — Birch, Stewart, Kolasch & Birch, LLP

(57) ABSTRACT

A control circuit of a wireless user equipment includes: a PDCP layer computing circuit for reading a PDCP SDU from a PDCP SDU buffer of a memory device of the wireless user equipment, and for generating a ciphered data based on the PDCP SDU; a RLC layer computing circuit for generating a RLC PDU based on the ciphered data; a MAC layer computing circuit for generating a MAC PDU based on the RLC PDU; and a channel encoding circuit for encoding the MAC PDU. The PDCP layer computing circuit directly transmits the ciphered data to the RLC layer computing circuit, the RLC layer computing circuit directly transmits the RLC PDU to the MAC layer computing circuit, and the MAC layer computing circuit directly transmits the MAC PDU to the channel encoding circuit, without buffering above data in any buffering circuit outside the control circuit.

1 Claim, 3 Drawing Sheets

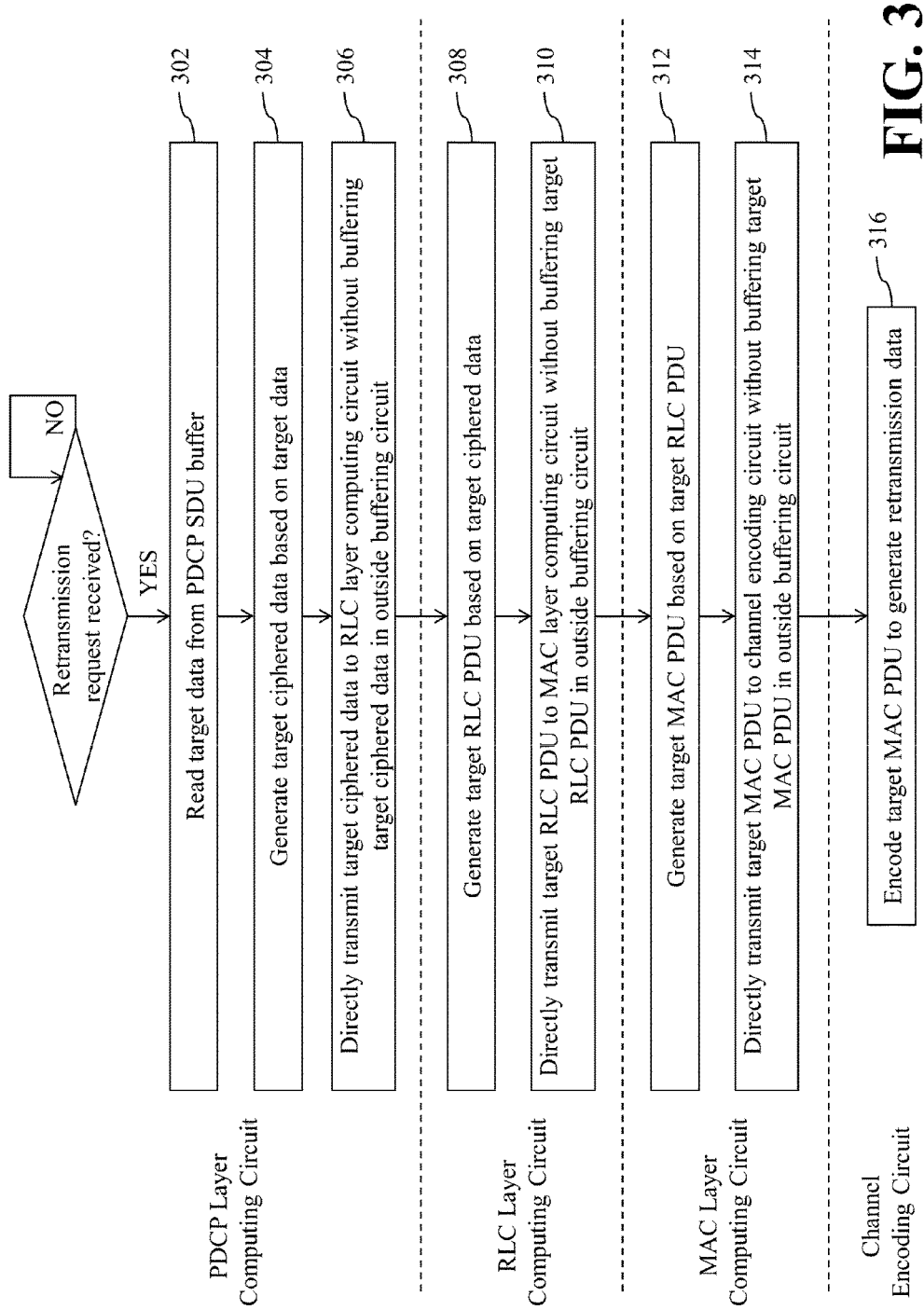

CONTROL CIRCUIT OF WIRELESS USER EQUIPMENT

CROSS-REFERENCE TO RELATED APPLICATIONS

This application claims the benefit of priority to Patent Application No. 104109222, filed in Taiwan on Mar. 23, 2015; the entirety of which is incorporated herein by reference for all purposes.

BACKGROUND

The disclosure generally relates to a mobile communication system and, more particularly, to a control circuit for controlling a wireless user equipment to conduct wireless communications with a communication station.

In a conventional mobile communication system, data generated by respective communication protocol layer circuits of the control circuit of the wireless user equipment (UE) will be buffered in buffering circuits outside the control circuit. A lower layer circuit will read the data generated by an upper layer circuit from the buffering circuits outside the control circuit when needed.

For example, when the wireless UE needs to transmit data to the network side, computing circuits in different layers of the conventional control circuit require to conduct write and read operations to the buffering circuits outside the control circuit many times in order to generate required uplink data. As is well known in related art, the buffering circuits are typically realized with various volatile memories, and thus each of the write and read operations requires certain waiting and accessing time. As a result, the data throughput performance of the control circuit of the conventional wireless UE is severely restricted and cannot be effectively improved since considerable time should be taken by the control circuit to access the outside buffering circuits many times.

BRIEF DESCRIPTION OF THE DRAWINGS

FIG. 3 shows a simplified flowchart of a method for generating retransmission data according to one embodiment of the present disclosure.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
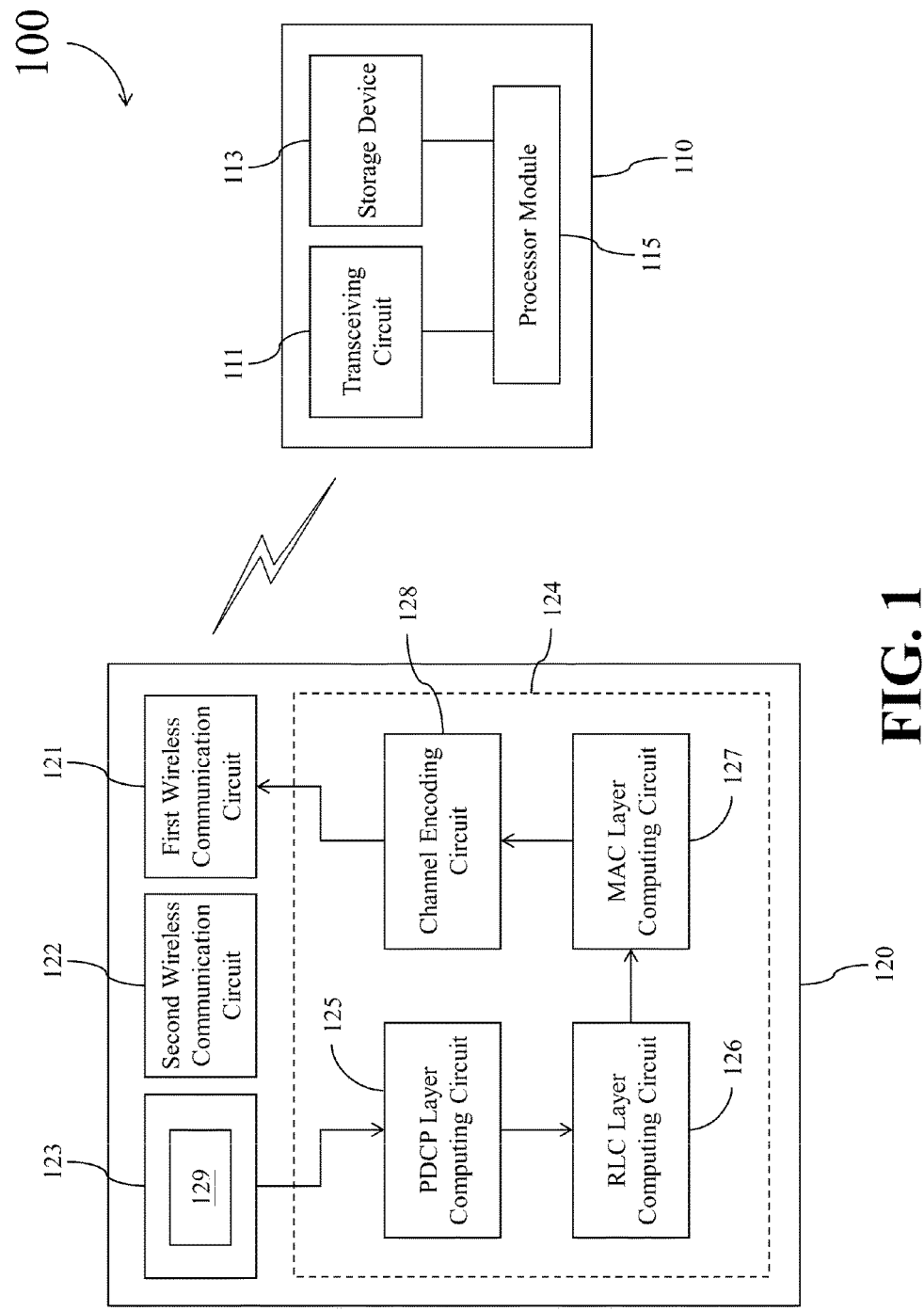
FIG. 1 shows a simplified functional block diagram of a mobile communication system according to one embodiment of the present disclosure.

FIG. 1 shows a simplified functional block diagram of a mobile communication system 100 according to one embodiment of the present disclosure. The mobile communication system 100 comprises multiple communication stations and multiple wireless user equipments (UEs). For the purpose of explanatory convenience in the following description, FIG. 1 only shows an example communication station 110 and an example wireless UE 120. As shown in FIG. 1, the communication station 110 comprises a transceiving circuit 111, a storage device 113, and a processor module 115. The wireless UE 120 comprises a first wireless communication circuit 121, a second wireless communication circuit 122, a memory device 123, and a control circuit 124. The control circuit 124 comprises a packet data convergence protocol (PDCP) layer computing circuit 125, a radio link control (RLC) layer computing circuit 126, a medium access control (MAC) layer computing circuit 127, and a channel encoding circuit 128. Other communication stations and wireless UEs in the mobile communication system 100 have similar structure as the aforementioned communication station 110 and wireless UE 120.

In the communication station 110, the transceiving circuit 111 is configured to operably transmit signals by adopting a first radio access technology (RAT). The storage device 113 is configured to operably store required data for the operations of the communication station 110. The processor module 115 is coupled with the transceiving circuit 111 and the storage device 113, and configured to operably control the operations of the transceiving circuit 111 and the storage device 113.

In the wireless UE 120, the first wireless communication circuit 121 is configured to operably communicate with the transceiving circuit 111 of the communication station 110 by adopting the first RAT. The second wireless communication circuit 122 is configured to operably communicate with one or more access points (APs, not shown in FIG. 1) by adopting a second RAT different from the first RAT. The memory device 123 is configured to operably store the data received by the first wireless communication circuit 121 and the second wireless communication circuit 122, and to operably provide a PDCP service data unit (SDU) buffer 129. The control circuit 124 is coupled with the first wireless communication circuit 121, the second wireless communication circuit 122, and the memory device 123. The control circuit 124 is configured to operably access the data stored in the memory device 123, and to operably control the operations of the first wireless communication circuit 121, the second wireless communication circuit 122, and the memory device 123.

In practice, each of the transceiving circuit 111 and the first wireless communication circuit 121 may comprise one or more antennas, one or more modulators/demodulators, one or more analog signal processing circuits, and/or one or more digital processing circuits for communicating with other devices by utilizing the first RAT. The second wireless communication circuit 122 may comprise one or more antennas, one or more modulators/demodulators, one or more analog signal processing circuits, and/or one or more digital processing circuits for communicating with other devices by utilizing the second RAT. Each of the storage device 113 and the memory device 123 may be realized with one or more volatile/non-volatile memory circuits, such as registers, hard drives, or flash memory devices. Each of the processor module 115 and the control circuit 124 may be realized with one or more microprocessors, one or more network processors, one or more digital signal processing circuits, and/or other suitable processing circuits.

In other words, the PDCP layer computing circuit 125, the RLC layer computing circuit 126, the MAC layer computing circuit 127, and the channel encoding circuit 128 of the control circuit 124 may be realized with different circuit compnents, or may be integrated into a single circuit chip.

For the purpose of explanatory convenience, other components of the mobile communication system 100 and their connection relationships are not shown in FIG. 1.

As can be appreciated from the foregoing descriptions, the wireless UE 120 is capable of communicating with the communication station 110 adopting the first RAT while communicating with an available access point adopting the second RAT. In practice, the first RAT may refer to one or more wireless wide area network (WWAN) technologies, wireless metropolitan area network (WMAN) technologies, or other suitable wire communication technologies with a wider communication range, such as WiMAX, GSM, UMTS, HSPA, LTE, LTE-Advanced and other 3GPP RATs. The second RAT may refer to one or more wireless local area network (WLAN) technologies, or other suitable wire communication technologies with a shorter communication range (compared with the first RAT), such as IEEE 802.11 series RATs.

For the illustrative purpose, it is assumed hereinafter that the first RAT is referred to at least one of the 3GPP RATs. Thus, the communication station 110 may be realized with a 3GPP base station (BS), such as a Node B or an Evolved Node B (eNodeB or eNB). In addition, the communication station 110 and one or more access points may be co-located in substantially the same location.

As described previously, when the wireless UE 120 needs to transmit data to the network side, computing circuits in different layers of the conventional control circuit require to conduct write and read operations to the buffering circuits outside the control circuit many times in order to generate a required uplink data. Accordingly, the data throughput performance of the conventional control circuit is severely restricted and cannot be effectively improved since considerable time should be taken by the control circuit to access the outside buffering circuits many times.

In the disclosed mobile communication system 100, the control circuit 124 of the wireless UE 120 is configured to minimize the opportunities of accessing external buffering circuits to reduce the accessing time so as to increase the data throughput performance.

The operations of transmitting uplink data to the networks side conducted by the control circuit 124 will be further described in the following by reference to FIG. 2.

Figure 2:
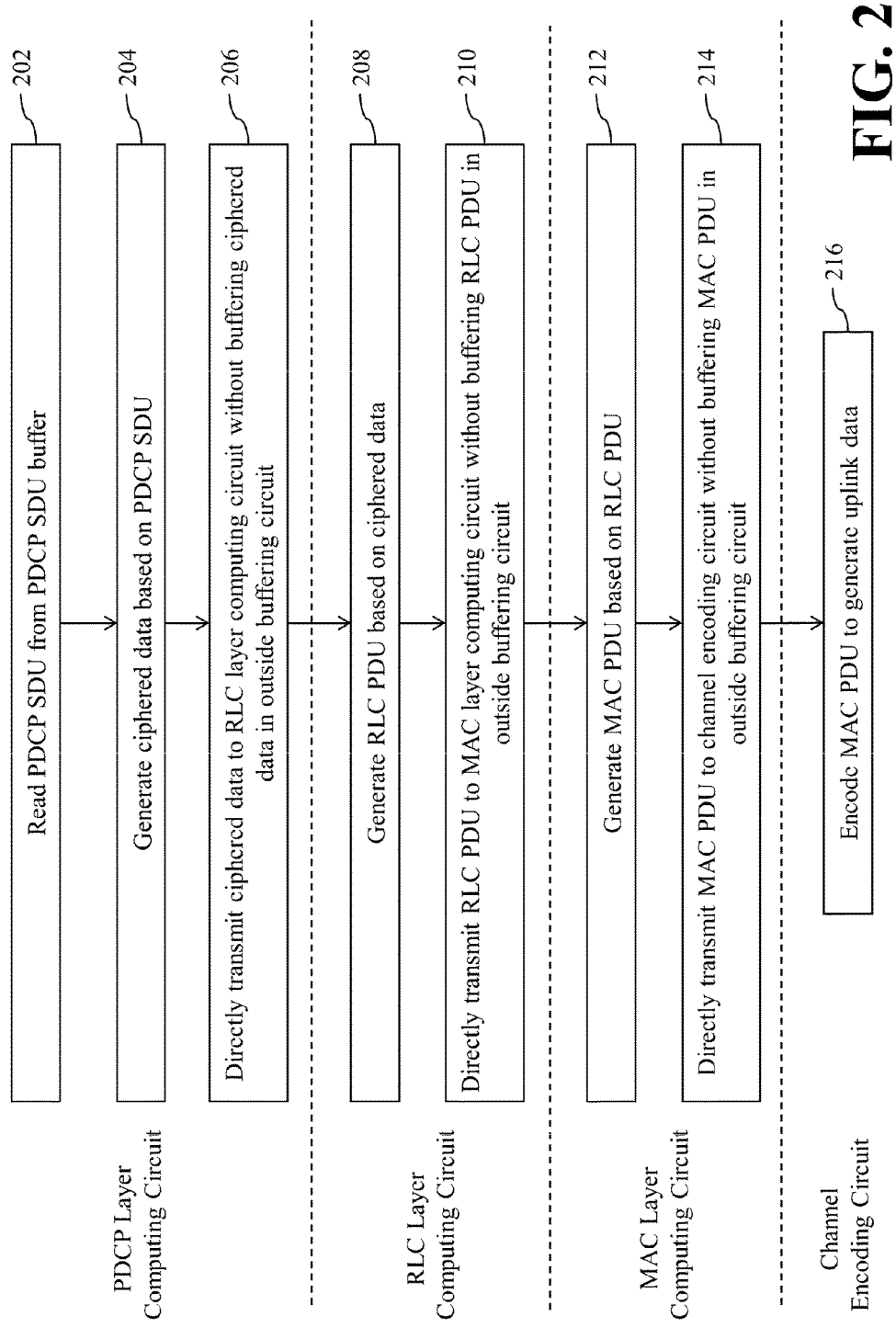
FIG. 2 shows a simplified flowchart of a method for generating uplink data according to one embodiment of the present disclosure.

FIG. 2 shows a simplified flowchart of a method for generating uplink data according to one embodiment of the present disclosure. In the flowchart of FIG. 2, operations within a column under the name of a specific device are operations to be performed by the specific device. For example, operations within a column under the label "PDCP Layer Computing Circuit" are operations to be performed by the PDCP layer computing circuit 125, operations within a column under the label "RLC Layer Computing Circuit" are operations to be performed by the RLC layer computing circuit 126, operations within a column under the label "MAC Layer Computing Circuit" are operations to be performed by the MAC layer computing circuit 127, and operations within a column under the label "Channel Encoding Circuit" are operations to be performed by the channel encoding circuit 128. The same analogous arrangement also applies to the subsequent flowcharts.

When the wireless UE 120 needs to transmit uplink data to the network side, the PDCP layer computing circuit 125 of the control circuit 124 performs the operation 202 to read a PDCP service data unit P_SDU from the PDCP SDU buffer 129 of the memory device 123.

In the operation 204, the PDCP layer computing circuit 125 generates a ciphered data P_PDU based on the PDCP service data unit P_SDU. For example, the PDCP layer computing circuit 125 may conduct an integrity protection operation and a ciphering operation on the PDCP service data unit P_SDU to generate the ciphered data P_PDU.

In the operation 206, the PDCP layer computing circuit 125 directly transmits the ciphered data P_PDU to the RLC layer computing circuit 126 without buffering the ciphered data P_PDU in any buffering circuit (e.g., the memory device 123) outside the control circuit 124.

In the operation 208, the RLC layer computing circuit 126 generates a RLC protocol data unit R_PDU based on the ciphered data P_PDU transmitted from the PDCP layer computing circuit 125.

In the operation 210, the RLC layer computing circuit 126 directly transmits the RLC protocol data unit R_PDU to the MAC layer computing circuit 127 without buffering the RLC protocol data unit R_PDU in any buffering circuit (e.g., the memory device 123) outside the control circuit 124.

In the operation 212, the MAC layer computing circuit 127 generates a MAC protocol data unit M_PDU based on the RLC protocol data unit R_PDU transmitted from the RLC layer computing circuit 126.

In the operation 214, the MAC layer computing circuit 127 directly transmits the MAC protocol data unit M_PDU to the channel encoding circuit 128 without buffering the MAC protocol data unit M_PDU in any buffering circuit (e.g., the memory device 123) outside the control circuit 124.

In the operation 216, the channel encoding circuit 128 encodes the MAC protocol data unit M_PDU transmitted from the MAC layer computing circuit 127 to generate an uplink data UL_DATA, and then transmits the uplink data UL_DATA to the communication station 110, which is currently within the communication range of the wireless UE 120, through the first wireless communication circuit 121.

As can be appreciated from the foregoing descriptions, the PDCP layer computing circuit 125 does not buffer the ciphered data P_PDU in any buffering circuit outside the control circuit 124, the RLC layer computing circuit 126 does not buffer the RLC protocol data unit R_PDU in any buffering circuit outside the control circuit 124, and the MAC layer computing circuit 127 does not buffer the MAC protocol data unit M_PDU in any buffering circuit outside the control circuit 124.

Instead, the PDCP layer computing circuit 125 directly transmits the ciphered data P_PDU to the RLC layer computing circuit 126, the RLC layer computing circuit 126 directly transmits the RLC protocol data unit R_PDU to the MAC layer computing circuit 127, and the MAC layer computing circuit 127 directly transmits the MAC protocol data unit M_PDU to the channel encoding circuit 128.

Accordingly, during the generating operation of the uplink data UL_DATA, the control circuit 124 only needs to read the PDCP service data unit P_SDU from the PDCP SDU buffer 129 of the memory device 123, and needs not to access the memory device 123 in later stages. Obviously, the number of times and total accessing time required for the control circuit 124 to access the outside memory device 123 can be greatly reduced by adopting the uplink data generating method of FIG. 2, thereby effectively increasing the data throughput performance of the control circuit 124.

The operations of retransmitting uplink data to the networks side conducted by the control circuit 124 will be further described in the following by reference to FIG. 3.

FIG. 3 shows a simplified flowchart of a method for generating retransmission data according to one embodiment of the present disclosure.

As shown in FIG. 3, when the PDCP layer computing circuit 125 of the control circuit 124 receives a retransmission request from the network side, the PDCP layer computing circuit 125 performs the operation 302 to read a target data T_DATA corresponding to the data to be retransmitted from the PDCP SDU buffer 129 of the memory device 123.

In the operation 304, the PDCP layer computing circuit 125 generates a target ciphered data TP_PDU based on the target data T_DATA. For example, the PDCP layer computing circuit 125 may conduct an integrity protection operation and a ciphering operation on the target data T_DATA to generate the target ciphered data TP_PDU.

In the operation 306, the PDCP layer computing circuit 125 directly transmits the target ciphered data TP_PDU to the RLC layer computing circuit 126 without buffering the target ciphered data TP_PDU in any buffering circuit (e.g., the memory device 123) outside the control circuit 124.

In the operation 308, the RLC layer computing circuit 126 generates a target RLC protocol data unit TR_PDU based on the target ciphered data TP_PDU transmitted from the PDCP layer computing circuit 125.

In the operation 310, the RLC layer computing circuit 126 directly transmits the target RLC protocol data unit TR_PDU to the MAC layer computing circuit 127 without buffering the target RLC protocol data unit TR_PDU in any buffering circuit (e.g., the memory device 123) outside the control circuit 124.

In the operation 312, the MAC layer computing circuit 127 generates a target MAC protocol data unit TM_PDU based on the target RLC protocol data unit TR_PDU transmitted from the RLC layer computing circuit 126.

In the operation 314, the MAC layer computing circuit 127 directly transmits the target MAC protocol data unit TM_PDU to the channel encoding circuit 128 without buffering the target MAC protocol data unit TM_PDU in any buffering circuit (e.g., the memory device 123) outside the control circuit 124.

In the operation 316, the channel encoding circuit 128 encodes the target MAC protocol data unit TM_PDU transmitted from the MAC layer computing circuit 127 to generate a retransmission data RT_DATA, and then transmits the retransmission data RT_DATA to the communication station 110, which is currently within the communication range of the wireless UE 120, through the first wireless communication circuit 121.

As can be appreciated from the foregoing descriptions, the PDCP layer computing circuit 125 does not buffer the target ciphered data TP_PDU in any buffering circuit outside the control circuit 124, the RLC layer computing circuit 126 does not buffer the target RLC protocol data unit TR_PDU in any buffering circuit outside the control circuit 124, and the MAC layer computing circuit 127 does not buffer the target MAC protocol data unit TM_PDU in any buffering circuit outside the control circuit 124.

Instead, the PDCP layer computing circuit 125 directly transmits the target ciphered data TP_PDU to the RLC layer computing circuit 126, the RLC layer computing circuit 126 directly transmits the target RLC protocol data unit TR_PDU to the MAC layer computing circuit 127, and the MAC layer computing circuit 127 directly transmits the target MAC protocol data unit TM_PDU to the channel encoding circuit 128.

Accordingly, during the generating operation of the retransmission data RT_DATA, the control circuit 124 only needs to read the target data T_DATA corresponding to the data to be retransmitted from the PDCP SDU buffer 129 of the memory device 123, and needs not to access the memory device 123 anymore. Obviously, the number of times and total accessing time required for the control circuit 124 to access the outside memory device 123 can be greatly reduced by adopting the retransmission data generating method of FIG. 3, thereby effectively increasing the data throughput performance of the control circuit 124.

In one embodiment, the aforementioned target data T_DATA is an entire PDCP service data unit. In this situation, the PDCP layer computing circuit 125 may conduct an integrity protection operation and/or a ciphering operation on the PDCP service data unit in the operation 304 to generate the target ciphered data TP_PDU.

In another embodiment, the aforementioned target data T_DATA is merely a data segment of a single PDCP service data unit, rather than an entire PDCP service data unit. In this situation, the PDCP layer computing circuit 125 may generate the target ciphered data TP_PDU based on only the data segment to be retransmitted in the operation 304 to reduce required computing source.

According to the foregoing elaborations, it is apparent that the number of times and total accessing time required for the control circuit 124 to access the outside memory device 123 can be greatly reduced by adopting the uplink data generating method of FIG. 2 and/or by adopting the retransmission data generating method of FIG. 3, thereby effectively increasing the data throughput performance of the control circuit 124 and the wireless UE 120.
On the other hand, since the number of times for accessing the outside memory device 123 is greatly reduced, the power consumption of the wireless UE 120 can also be reduced by adopting the uplink data generating method of FIG. 2 and/or by adopting the retransmission data generating method of FIG. 3

Furthermore, since the architecture disclosed above effectively lowers the memory size requirement of the wireless UE 120, the hardware cost of the wireless UE 120 can be reduced accordingly.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The tem "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit (124) of a wireless user equipment (UE) (120) for controlling the wireless UE (120) to conduct wireless communications with a communication station (110), wherein the wireless UE (120) comprises a wireless communication circuit (121) and a memory device (123), the control circuit (124) comprising:

- a packet data convergence protocol (PDCP) layer computing circuit (125) arranged to operably read a target data (T_DATA) from a PDCP SDU buffer (129) of the memory device (123) when receiving a retransmission request, and to operably generate a target ciphered data (TP_PDU) based on the target data (T_DATA);
- a radio link control (RLC) layer computing circuit (126) arranged to operably generate a target RLC protocol data unit (TR_PDU) based on the target ciphered data (TP_PDU);
- a medium access control (MAC) layer computing circuit (127) arranged to operably generate a target MAC protocol data unit (TM_PDU) based on the target RLC protocol data unit (TR_PDU); and
- a channel encoding circuit (128) arranged to operably encode the target MAC protocol data unit (TM_PDU) to generate a retransmission data (RT_DATA), and to operably transmit the retransmission data (RT_DATA) to the communication station (110) through the wireless communication circuit (121);

wherein the PDCP layer computing circuit (125) directly transmits the target ciphered data (TP_PDU) to the RLC layer computing circuit (126) with buffering the target ciphered data (TP_PDU) in any buffering circuit outside the control circuit (124), the RLC layer computing circuit (126) directly transmits the target RLC protocol data unit (TR_PDU) to the MAC layer computing circuit (127) without buffering the target RLC protocol data unit (TR_PDU) in any buffering circuit outside the control circuit (124), and the MAC layer computing circuit (127) directly transmits the target MAC protocol data unit (TM_PDU) to the channel encoding circuit (128) without buffering the target MAC protocol data unit (TM_PDU) in any buffering circuit outside the control circuit (124), and wherein the target data (T_DATA) is a data segment of a single PDCP service data unit, not an entire PDCP service data unit.

* * * * *